United States Patent [19]
Blunden

[11] 3,866,542
[45] Feb. 18, 1975

[54] SECUREMENT SYSTEM FOR RAIL CARS

[75] Inventor: Donald J. Blunden, Southfield, Mich.

[73] Assignee: Whitehead & Kales Company, River Rouge, Mich.

[22] Filed: Aug. 16, 1972

[21] Appl. No.: 281,210

Related U.S. Application Data

[63] Continuation-in-part of Ser. No. 262,234, June 13, 1972, Pat. No. 3,797,410.

[52] U.S. Cl. .......... 105/368 R, 206/335, 248/119 R
[51] Int. Cl. ........................ B60p 7/08, B61d 45/00
[58] Field of Search ........ 105/366 C, 368 T, 368 R, 105/369 H; 296/1 A; 280/179 A, 179 R; 248/361 A, 361 R, 119 R; 206/46 M, 65 R

[56]            References Cited
         UNITED STATES PATENTS
1,649,598   11/1927   Kirchner ....................... 105/366 C
2,415,975    2/1947   Thomson ....................... 105/366 C
3,605,636    9/1971   Blunden et al. ................. 105/368 T
3,659,533    5/1972   Venditty ........................ 105/368 T
3,738,481    6/1973   Cwycyshyn et al. ............ 206/46 M
3,739,906    6/1973   Cwycyshyn et al. ............ 206/65 R

*Primary Examiner*—Drayton E. Hoffman
*Attorney, Agent, or Firm*—Whittemore, Hulbert & Belknap

[57]              ABSTRACT

Apparatus for securing a plurality of vehicles on the deck of a transport such as a rail car. Guide rails on the deck are engaged by shoes mounted on the underframes of the vehicles to guide the vehicles during loading. Locking means are provided simultaneously to engage the shoes and secure the vehicles in loaded position. The locking means comprise rotatable bars provided with locking lugs. The locking lugs are interengageable with similar lugs on the shoes upon rotation of the bars to secure the vehicles against movement. The lugs on the rotatable bars are in groups of substantial length so that highly accurate positioning of the vehicles preparatory to securing them is not necessary.

12 Claims, 10 Drawing Figures

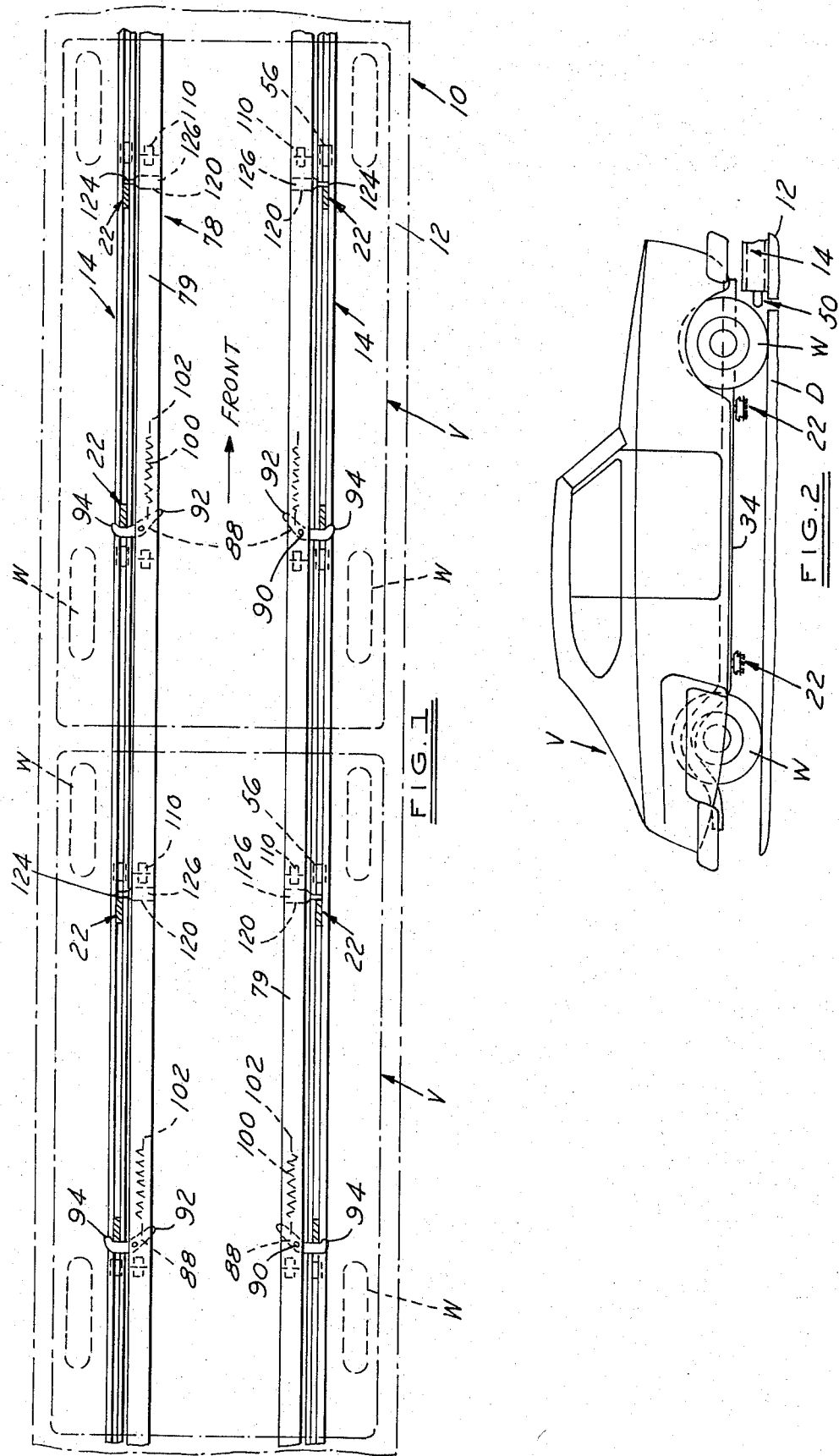

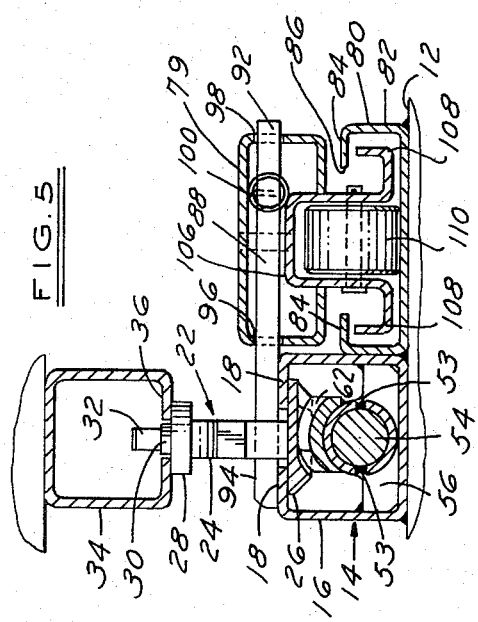
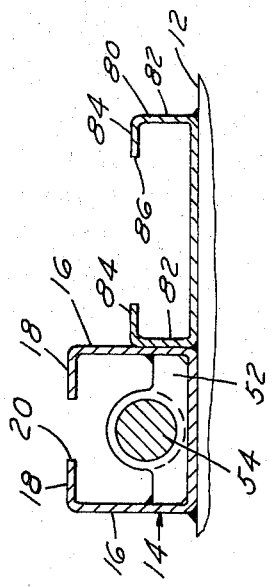
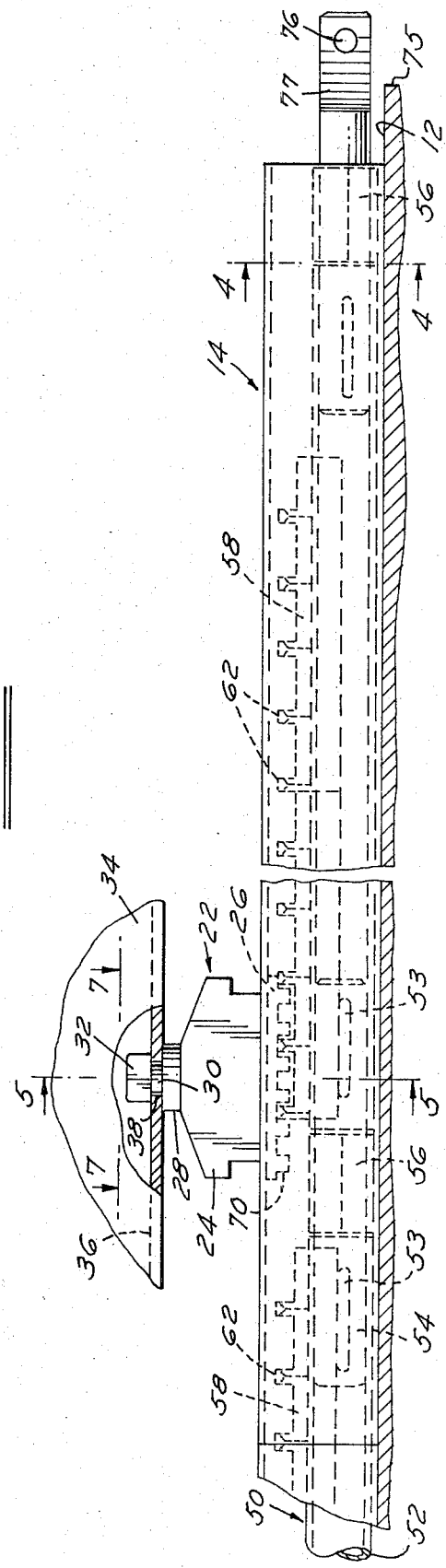

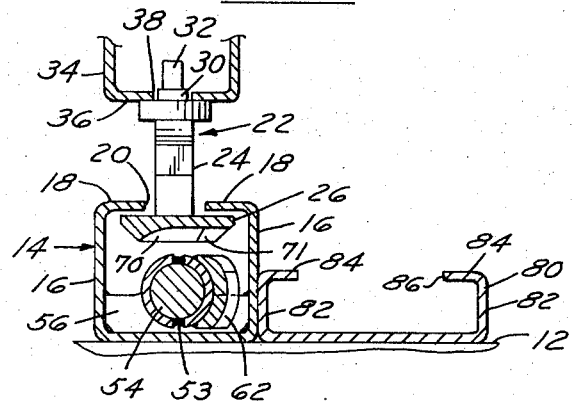
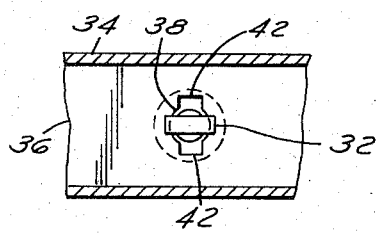
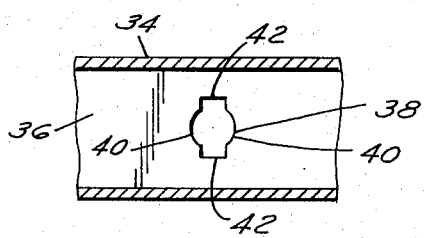
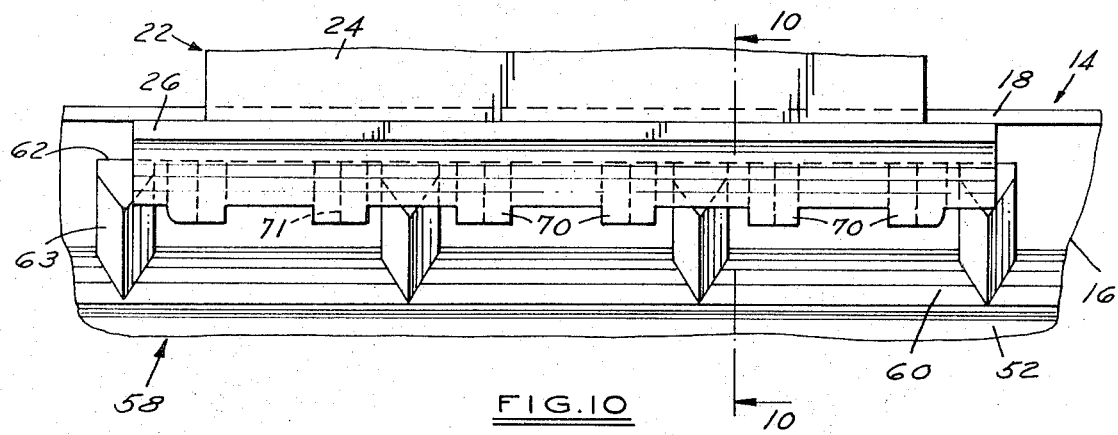
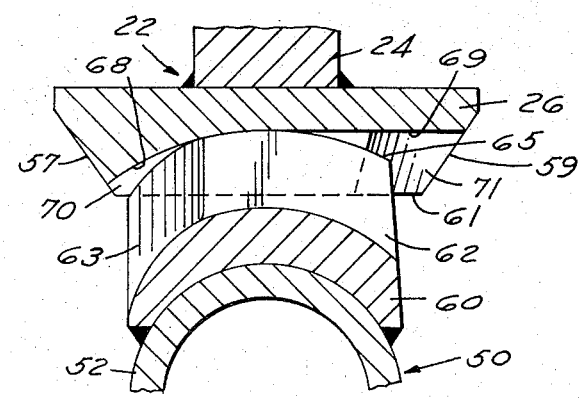

3,866,542

SECUREMENT SYSTEM FOR RAIL CARS

RELATED APPLICATION

This application is a continuation-in-part of my copending application Ser. No. 262,234, filed June 13, 1972, now U.S. Pat. No. 3,797,410.

BACKGROUND AND SUMMARY OF THE INVENTION

This invention makes it necessary only to roughly position the vehicles on the deck of a rail car prior to securing them, highly accurate positioning being unnecessary.

This invention also makes it possible for a workman to secure a plurality of vehicles on the deck of a rail car without entering the car. The means for securing the vehicles on the deck are operable simultaneously from outside the rail car. Heretofore a crew of workmen had to enter the rail car to tie down the vehicles, which took considerable time and risked scratching or marring the vehicles.

It is among the objects and special features of this invention to provide shoes on the vehicles engageable with a guide rail on the deck of the transport to guide the vehicles as they are moved along the deck, and locking means for engaging the shoes to secure the loaded vehicles in selected positions for transit. In the specific embodiment about to be described the locking means comprises a bar supported for rotation and having a plurality of locking lugs engageable with corresponding lugs on the shoes to clamp the shoes when the bar is rotated. The locking lugs on the bar are preferably grouped together in a series of lugs of substantial length so that the vehicles do not have to be as accurately positioned as heretofore. The bar is adapted to be rotated from outside the rail car to simultaneously secure a plurality of the loaded vehicles. Accordingly, there is no necessity for a crew to enter the rail car to tie down the vehicles.

Other objects and features of the invention will become more apparent as the description proceeds, especially when taken in conjunction with the accompanying drawings, wherein:

FIG. 1 is a fragmentary top plan view diagrammatically showing two vehicles loaded on the deck of a rail car.

FIG. 2 is a side elevational view showing a vehicle on a loading dock just prior to the entry of its guide shoes into the guide rail or channel on the deck of the rail car.

FIG. 3 is a fragmentary side elevational view with parts in section showing how a vehicle is secured upon the deck of the rail car by the locking means of my invention.

FIG. 4 is a sectional view taken on the line 4—4 of FIG. 3.

FIG. 5 is a sectional view taken on the line 5—5 in FIG. 3 showing the locking means in the locked position.

FIG. 6 is a sectional view similar to FIG. 5 but without the loading mechanism and showing the vehicle locking means in the unlocked position.

FIG. 7 is a sectional view taken on the line 7—7 in FIG. 3.

FIG. 8 is similar to FIG. 7 but with the shoe removed.

FIG. 9 is an enlarged fragmentary side elevational view of a portion of FIG. 3 showing the locking means in locked position with respect to a shoe.

FIG. 10 is a sectional view taken on the line 10—10 in FIG. 9.

Referring now more particularly to the drawings, a rail car 10 is shown having an elongated horizontal deck 12 which extends lengthwise of the rail car and preferably is open at both ends of the rail car and of sufficient width to carry the vehicles to be transported with at least minimum clearance. The rail car may have a single deck or it may be a multi-level rail car having upper decks in addition to the lower deck.

A pair of laterally spaced parallel channel guides 14 are mounted lengthwise upon the deck 12 of the rail car. They are spaced apart a distance somewhat less than the spacing between the ground-engaging wheels W of the vehicles V. The channel guides 14 have the configuration best shown in FIGS. 4 to 6. They are of generally square tubular form and are open ended having their bottom walls rigidly secured as by welding or other suitable means upon the deck 12. The open ends of the channel guides 14 preferably terminate substantially flush with the ends of the deck 12 as shown in FIG. 2. Each channel guide 14 has the laterally spaced upright side walls 16 terminating at their upper ends in horizontally inturned flanges 18 whose inner edges aere spaced apart to define an elongated slot 20 extending from end to end of the channel guide.

The vehicles V each may have front and rear shoes 22 mounted upon the underframe portion on each side thereof. The two shoes on one side of the vehicle are disposed one behind the other in positions to engage one of the channel guides 14. The other two shoes are mounted on the other side of the vehicle in positions to engage the other channel guide 14. Thus the lateral spacing of the shoes of each vehicle is the same as that of the channel guides 14. Instead of four shoes, each vehicle may have only two shoes, one in position to engage one channel guide 14, and the other positioned to engage the other channel guide.

As seen in FIGS. 3, 5 and 6, the shoes are of generally inverted T shape in cross section having the body section 24 which is in the form of a vertical plate and the elongated horizontal lug locking section or base 26 of the lower end of the body section 24 which extends lengthwise of the body section. At the upper end of the body section 24 there is a circular collar 28 above which is a vertical circular neck 30 of reduced diameter relative to the collar. Above the neck there is a head 32 which is in the form of a rectangular plate disposed in the plane of the body section 24. The length of the head 32 is greater than the diameter of the neck 30 as clearly seen in FIG. 3.

The underframe portions of the vehicles comprise the elongated horizontal frame members 34 which have the horizontal bottom walls 36 provided with key-shaped slots 38 by which the shoes are mounted thereto. The key slots 38 are of the configuration shown in FIG. 8, having a generally circular form defined by the front and rear arcs 40 and also a superimposed generally rectangular form defined by the lateral extensions 42. The rectangular portion of the slot extends transversely of the vehicle and is slightly larger than the shoe head 32. The circular portion of the slot is slightly larger than the neck 30 of the shoe but its diameter is less than the length of the shoe head 32 so that a shoe head 32 may enter a slot 38 when the head extends transversely thereof and the shoe will be retained therein when the shoe is turned 90° to the FIG. 7 position.

The shoes are intended to be mounted on the underframes of the vehicles just before the vehicles are loaded onto the rail car. When the shoes are turned to the FIG. 7 position, the body sections 24 and bases 26 extend in a longitudinal direction. Such body portions are narrower than the channel guide slot 20 for free entry into the slot with the base or lug locking sections 26 extending inside the channel guide.

It will be apparent during loading of a vehicle onto the deck 12 of the rail car with the shoes 22 in line with the channel guides 14, that the lower or base portions 26 of the shoes upon entry into the channel guides will guide the vehicles to a desired loaded position.

Reference is now made to FIGS. 3 to 6, 9 and 10 for a description of the mechanism for securing the vehicles in loaded position on the deck 12 of the rail car. Such mechanism includes an elongated locking member or bar 50 which is disposed within and extends from one end to the other of each channel guide 14. Each of the bars 50 comprises individual elongated tubular bar segments 52 which are arranged in spaced end-to-end relation and are connected by short bar sections 54 telescoped within and secured to the adjacent ends of the segments as for example by welding. As seen, the end portions of the tubular bar segments 52 have elongated slots 53 where the weld between the parts is made. The bars 50 are supported for rotation by the tubular pillow blocks 56 which rotatably receive the connecting sections 54 and are seated upon the bottom wall of each channel guide 14. Such pillow blocks are rigidly anchored within the channel guides and for this purpose preferably have laterally extended portions engaging the side walls of the channel guides and secured thereto as by welding. The pillow blocks 56 restrain the bars 50 from longitudinal movement by contact with the ends of the bar segments 52. The upper surfaces of the pillow blocks are of the same arcuate size and form as the tubular bar segments 52 and are flush with the upper surfaces of such bar segments so that the shoes will not catch on either the pillow blocks or the bar segments when moving through the channel guides.

Clamping or locking members 58 are rigidly secured to the bar segments 52 by any suitable means as for example by welding. Such locking members 58 are in the form of elongated arcuate segments 60 having the radially outwardly projecting, circumferentially extending, equally longitudinally spaced locking lugs 62. Such locking lugs are themselves arcuate in form corresponding generally to the curve of the arcuate sections 60 and being tapered or V-shaped at their leading ends as shown at 63 in FIGS. 9 and 10. Preferably, two or more of the locking members 58 are secured to each bar segment 52 in aligned abutting end-to-end relation to increase the number of locking lugs in the group and thereby provide a series of locking lugs over a considerable distance substantially greater than the length of a shoe, thus requiring less accurate positioning of the vehicles which are to be secured. If desired, locking segments abutting end to end may be secured to each bar segment throughout the entire length thereof to provide a continuous series of locking lugs interrupted only by the pillow blocks 56. All of the locking lugs 62 between pillow blocks are equally spaced even when two or more locking members 58 are abutted end to end.

The lug locking section or base 26 of each shoe 22 is a substantially flat horizontal member preferably having the downwardly tapering sides 57, 59 and the horizontal bottom surface 61. Base 26 is formed with longitudinally equally spaced transversely extending grooves 68 in its bottom surface 61 which also intersect sides 57 and 59. Such grooves 68 separate and define the transversely extending locking lugs 70. The base of each groove 68 is straight as shown at 69 for about one-half its length and may be curved as shown in FIG. 10 on an arc corresponding generally to the arc of curvature of the outer surfaces 65 of the locking lugs 62 on the rotatable locking bar 50. The lugs 70 are tapered or V-shaped as shown at 71 at the ends facing the tapered ends 63 of locking bar lugs 62. As seen in FIG. 9, the lugs 70 on the shoes are spaced apart shorter distances than the lugs on the locking bar 50 so that two of the shoe lugs will fit between a pair of lugs on the locking bar. This precise relationship while preferred may be varied however, it only being necessary that the locking lugs of the shoes interengage or interfit with the locking lugs of the bar 50.

When the shoes 22 are engaged in the channel guides 14, the shoe bases 26 are disposed directly above the locking bar 50 as shown in FIGS. 5 and 6. The lugs 70 extend transversely of the locking bar and hence parallel to lugs 62 in a position such that upon rotation of the locking bar the locking bar lugs 62 will interengage with the lugs on the shoes, entering readily through the straight ends 69 of the grooves 68. As seen in FIG. 5, the inturned flanges 18 of the guide channel confine the shoe bases 26 so that the shoe lugs cannot lift over the lugs on the locking bar.

FIG. 6 shows the locking bar in its retracted position of rotation. The shoe at this time is preferably out of contact with the inturned flanges 18 of the channel guide 14. FIG. 5 shows the locking bar rotated to the locking position in which the shoe is elevated by the clamping members 58 of the locking bar into contact with the inturned flange 18. The shoes are capable of being elevated because they are attached to sprung portions of the vehicles. While there is some degree of frictional contact between the shoe bases 26 and the flanges 18 this is not primarily to prevent relative longitudinal movement since such holding action is accomplished by the interengagement of the shoe lugs and locking bar lugs. The inturned flanges 18 prevent the shoe lugs from lifting over and accidentally disengaging the locking bar lugs.

One end of the locking bar 50 extends substantially flush with or slightly beyond the end of the channel guide 14 and the end 75 of the rail car (FIG. 3). This bar end is formed with a hole 76 adapted to receive a tool or crank by means of which the bar may be readily rotated manually between retracted and locked positions. Preferably the end of the locking bar is beveled or tapered as at 77 on the side which is up when the locking bar is rotated to the retracted position of FIG. 6 so that the shoes 22 on the vehicles will not accidentally catch on the end of the locking bar during loading.

It will be understood that the opposite end of the locking bar 50 may bear the same relationship to the opposite end of the channel guide 14 and to the opposite end of the rail car as shown in FIG. 3 and may also be beveled or tapered and formed with a tool-receiving hole as in FIG. 3 for the same purposes so that locking and unlocking may be accomplished by a workman from either end of the rail car.

If the locking bar 50 is considered too long for convenient operation from one end, it may if desired be cut in half, that is transversely severed at or near the midpoint, in which event the locking members 58 adjacent one end of the rail car would be simultaneously operated by one of the locking bar halves, and the locking members adjacent the other end of the rail car would be simultaneously operated by the other locking bar half.

No particular means need be provided for loading the vehicles on the rail car. They may be driven on by drivers, stopped and then locked in position in a single operation by the use of a tool inserted in the hole 76 at one end or the other of the locking bar. Alternatively, a loading mechanism may be provided for loading the vehicles. Such a mechanism is partially disclosed herein and for a further description thereof reference is made to said U.S. Pat. No. 3,797,410. Such mechanism may comprise a reciprocable loader 78, reciprocated by any suitable means, including elongated parallel bars 79 which are here shown as being in the form of tubular members connected to each other at one end. The bars 79 are guided for reciprocation by tracks or channels 80 which are rigidly secured lengthwise upon the deck 12 of the rail car in parallel relation to the channel guides 14 on the inboard sides thereof.

Each channel 80 has the laterally spaced upright side walls 82 terminating at their upper ends in horizontally inturned flanges 84 whose inner edges are spaced apart to define an elongated slot 86.

Each elongated loading bar 79 has a plurality of pusher dogs 88 pivoted thereto at longitudinally spaced points by vertical pivot pins 90. The number of dogs on each bar 79 may equal the number of vehicles to be loaded on deck 12. Dogs 88 are in the form of horizontal bell crank levers, one arm 92 of which is disposed within the tubular bar 79 and the other arm 94 of which extends through a slot 96 in the bar 79 over the top of the adjacent channel guide 14. The opposite wall of the loading bar 79 also has a slot 98 for clearing the end of arm 92 and for determining the limits of its pivotal movement.

The dogs 88 on each loading bar 79 are spaced apart a distance equal to the distance between the rear shoes on adjacent vehicles V when the vehicles are spaced apart the proper distance for loading as shown in FIG. 1. In other words, assuming the vehicles are of the same length, the distance between pusher dogs 88 on each loading bar 79 corresponds to the length of a vehicle plus the distance between successive vehicles in the line.

In the position of the dogs shown in FIG. 1, the arms 94 extend across the tops of the associated channel guides 14 in positions to engage the rear ends of shoes 22 to advance the vehicles to the right. Tension springs 100 are provided normally to urge the pusher dogs to the illustrated or operative position. Such tension springs are secured at one end to the arms 92 and at the other end 102 are secured to the top wall of the loading bar 79. The dogs are capable of retracting from the position of FIG. 1 against the tension of springs 100 and camming past the shoes 22 upon retraction of the loading bars 79.

A plurality of brackets 106 are rigidly secured at longitudinally spaced points to the loading bars 79. The brackets are generally of the inverted U shape shown in FIG. 5 and extend downwardly into channels 80 through slots 86. At their lower extremities, the brackets have outwardly and upwardly turned terminal portions 108 which extend under the inturned flanges 84 of channels 80 to prevent the loading bars 79 from lifting away from the channels. Such brackets support rollers 110 which roll upon the bottom walls of the channels 80 to facilitate the reciprocation of the loading bars 79.

Each loading bar 79 may also be provided with a plurality of stops 120, the number of stops corresponding to the number of vehicles in the line to be loaded. Each stop may comprise a plunger 124 reciprocable in a cylinder 126 secured to the loading bar 79. The stops 120 are disposed transversely with respect to the direction of reciprocation of the loading bars and in their extended positions shown in FIG. 1 the plungers 124 extend across the paths of the shoes 22. In the retracted positions of plungers 124 they are retracted substantially within the cylinders 126 and out of the paths of the shoes. Extension of the plungers may be effected by fluid pressure admitted to the cylinders 126. The plungers may be spring retracted.

Each of the stops 120 is spaced ahead of a dog 88 by a distance approximating the distance between the two shoes on each side of a vehicle so that when a pusher dog engages and pushes the rear side of the rear shoe of a vehicle, the plunger 124 of one of the stops engages the front side of a front shoe to prevent the vehicle from rolling ahead of the loader.

After a line of vehicles have been loaded in proper position on the deck 12 of the rail car, whether by power mechanism or by drivers, a tool may be inserted into the apertures in the ends of the locking bars 50 to rotate them from the position of FIG. 6 to that of FIG. 5. This action causes the locking lugs of the locking bar 50 to interengage with those of the shoes and to lift the shoes into substantial contact with the inturned flanges 18 of the channel guides 14. Because of the lengths of the groups of locking lugs 62 between pillow blocks on the locking bars 50, the vehicles need to be only roughly positioned relative thereto along the length of the rail car. FIG. 3 shows clearly that the shoe could be clamped even if several inches to the right of the position shown. The tapered noses on the confronting ends of the locking lugs will preclude interference when locking bars 50 are rotated and will also slightly adjust the longitudinal position of the vehicles if necessary. All of the vehicles will be locked simultaneously since all of the locking segments are disposed in a line on one side of the bar.

The shoes 22 preferably are secured to the underframes of the vehicles just prior to loading the vehicles onto the rail car. The shoes may be very readily attached to the underframe by orienting them so that the body section 24 and lug locking section 26 extend transversely of the vehicle, so that the head 32 may enter the rectangular portion 42 of the key slot 38 in the underframe bar 34. Then the shoes are rotated 90° as shown in FIG. 7 to a fore and aft position with respect to the vehicle in which they are prevented from dropping out. FIG. 2 shows a vehicle on a loading dock D with the shoes 22 attached in preparation for loading the rail car. The shoes are thus in alignment with the channel guides 14 to enter the channel guides when the vehicle is driven onto the rail car.

Unlocking of the vehicles is accomplished simply by reverse rotation of the locking bars 50 from the FIG. 5 position to the FIG. 6 position.

What I claim as my invention is:

1. Apparatus for securing a vehicle on the elongated deck of a transport, comprising guide means including a rail disposed on and extending lengthwise of the deck, locking means including an elongated member having a plurality of longitudinally spaced locking lugs and being mounted lengthwise upon the deck for movement between first and second positions, and a shoe carried by the vehicle and having a plurality of longitudinally spaced cooperating means thereon adapted to be engaged by said locking lugs, said shoe being guided along said rail when the vehicle is advanced lengthwise of the deck, said rail having means engageable with said shoe to restrain upward movement of said shoe relative to said rail, said locking lugs on said elongated member being engageable with said cooperating means on said shoe in said first position of said elongated member to secure the vehicle as aforesaid and being disengageable from said cooperating means on said shoe in said second position to release the vehicle, the particular locking lugs engaged with said cooperating means on said shoe in said first position of said elongated member depending upon the position of the vehicle lengthwise of the rail car.

2. Apparatus for securing a vehicle on the elongated deck of a transport, comprising guide means including a rail disposed on and extending lengthwise of the deck, locking means including an elongated member having a plurality of longitudinally spaced locking lugs and being mounted lengthwise upon the deck for movement between first and second positions, and a shoe mounted on the vehicle and having a plurality of locking lugs spaced apart lengthwise of said elongated member, said shoe being guided along said rail when the vehicle is advanced lengthwise of the deck, said rail having means engageable with said shoe to restrain upward movement of said shoe relative to said rail, said locking lugs on said elongated member being interengageable with the locking lugs on said shoe in said first position of said elongated member to secure the vehicle as aforesaid and being disengageable from the locking lugs on said shoe in said second position to release the vehicle.

3. The apparatus defined in claim 2, wherein said locking lugs on said elongated member are arranged in a group of substantial length to obviate the necessity for highly accurate longitudinal positioning of the secured vehicle.

4. The apparatus defined in claim 2, wherein means are provided for mounting said elongated member on the deck for rotation between said first and second positions, said locking lugs on said elongated member projecting radially outwardly therefrom and extending transversely thereof.

5. The apparatus defined in claim 4, wherein said locking lugs on said shoe extend transversely with respect to said elongated member, the confronting ends of the lugs on said shoes and the lugs on said elongated member being tapered to preclude interference during rotation of said elongated member from the second to first position thereof and to slightly adjust the longitudinal position of the vehicle if necessary.

6. Apparatus for securing a vehicle on the elongated deck of a transport, comprising guide means including a rail disposed on and extending lengthwise of the deck, a shoe mounted on the vehicle, said shoe being engageable with said rail and movable therealong when the vehicle is advanced lengthwise of the deck during loading, and locking means operable to engage said shoe and secure the vehicle on the deck, said locking means comprising an elongated member extending parallel to said rail and having a plurality of locking lugs spaced apart longitudinally thereof, said elongated member being movable between first and second positions, said shoe having locking lugs spaced apart lengthwise of the deck, said locking lugs on said elongated member being interengageable with the locking lugs on said shoe in said first position of said elongated member to secure the vehicle as aforesaid and being disengageable from the locking lugs on said shoe in said second position to release the vehicle, said shoe being held in engagement with said rail by said elongated member when the latter is turned to said first position, thereby preventing accidental disengagement of said lugs.

7. The apparatus defined in claim 6, wherein means are provided for mounting said elongated member for rotation between said first and second positions, said locking lugs on said elongated member projecting radially outwardly therefrom and extending circumferentially thereof, said locking lugs on said shoe extending transversely with respect to said elongated member, the confronting ends of the lugs on said shoe and the lugs on said elongated member being tapered to preclude interference during rotation of said elongated member from the second to first position thereof and to slightly adjust the longitudinal position of the vehicle if necessary.

8. Apparatus for securing a plurality of vehicles on the elongated deck of a transport, comprising guide means including a channel disposed on and extending lengthwise of the deck, shoes mounted on the vehicles, said shoes being guided along said channel when the vehicles are advanced lengthwise of the deck during loading, said channel having means engageable with said shoes to restrain upward movement of said shoes relative to said channel, and locking means operable to engage said shoes and secure the vehicles on the deck, said locking means comprising an elongated member extending lengthwise of and supported in said channel for rotation between first and second positions, said elongated member having longitudinally spaced locking lugs projecting radially outwardly therefrom and extending circumferentially thereof, said shoes each having locking lugs spaced apart longitudinally and extending transversely with respect to said elongated member, said locking lugs on said elongated member being interengageable with the locking lugs on said shoes in said first position of said elongated member to secure the vehicles as aforesaid and being disengageable from the locking lugs on said shoes in said second position to release the vehicles.

9. The apparatus defined in claim 8, wherein the confronting ends of the lugs on said shoes and the lugs on said elongated member are tapered to preclude interference during rotation of said elongated member from the second to first position thereof and to slightly adjust the longitudinal position of the vehicles if necessary.

10. The apparatus defined in claim 9, wherein said locking lugs on said elongated member are arranged in groups of substantial length to obviate the necessity for highly accurate longitudinal positioning of the secured vehicles.

11. The apparatus defined in claim 10, wherein said channel is a tubular member having an elongated slot in its top wall, said shoes having bases adapted to extend into said tubular member through said slot, said locking lugs on said elongated member are of arcuate form, and said locking lugs on said shoes project downwardly from said bases.

12. The apparatus defined in claim 11, wherein said bases of said shoes are held in engagement with the top wall of said tubular member by said interengaging lugs when said elongated member is turned to its first position, thereby preventing accidental disengagement of said lugs.

* * * * *